United States Patent
Mitsui

(10) Patent No.: US 8,279,467 B2
(45) Date of Patent: Oct. 2, 2012

(54) INFORMATION PROCESSING APPARATUS AND METHOD FOR INDICATING CONFLICTING PRINT SETTING FUNCTIONS

(75) Inventor: Akihiro Mitsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1446 days.

(21) Appl. No.: 11/835,755

(22) Filed: Aug. 8, 2007

(65) Prior Publication Data

US 2008/0144087 A1  Jun. 19, 2008

(30) Foreign Application Priority Data

Dec. 19, 2006  (JP) .................................. 2006-341940

(51) Int. Cl.
*G06F 15/00* (2006.01)
*G06K 1/00* (2006.01)

(52) U.S. Cl. ....................................... 358/1.15; 358/1.9

(58) Field of Classification Search ......................... None
See application file for complete search history.

(56) References Cited

U.S. PATENT DOCUMENTS 6,975,417 B1 * 12/2005 Hilpl et al. ................... 358/1.15
2006/0075355 A1 4/2006 Shiono et al.
2006/0103868 A1 * 5/2006 Mitsui .......................... 358/1.13

FOREIGN PATENT DOCUMENTS

| JP | 10-111744 | 4/1998 |
|----|-----------|--------|
| JP | 11-327732 | 11/1999 |
| JP | 2000-276010 | 10/2000 |
| JP | 2002-073314 | 3/2002 |
| JP | 2002-328757 | 11/2002 |
| JP | 2006-039638 | 2/2006 |
| JP | 2006-134288 A | 5/2006 |
| JP | 2006-260065 | 9/2006 |

* cited by examiner

*Primary Examiner* — Thierry Pham
(74) *Attorney, Agent, or Firm* — Fitzpatrick, Cella, Harper & Scinto

(57) ABSTRACT

An operation window including the first display area having a plurality of types of print setting items, and a second display area which displays log data representing the log of setting operations to the print setting items in the first display area is displayed. The second print setting item, which conflicts with the first print setting item, is set to be disabled on the basis of an operation to the first print setting item. Information containing a print setting value of the first print setting item before and after a change, and the second print setting item disabled along with the change is stored as the log data. When the designation of the second print setting item is detected, it is controlled to display log data so as to be distinct from other log data.

6 Claims, 11 Drawing Sheets

FIG. 7

```xml
<?xml version="1.0" encoding="UTF-8"?>
<PrinterDriveConfigurationModule>
   <UserOperationHistory>
     <History order="0" >
        <Feature name="JobInputBin">Casstte1</Feature>
        <UndoFeatureValue>Auto</UndoFeatureValue>
     </History>
     <History order="1">
        <Feature name="JobBooklet">On</Feature>
        <UndoFeatureValue>Off</UndoFeatureValue>
        <ConflictReason name="JobNup"/>
        <ConflictReason name="PageScaling"/>
        <ConflictReason name="JobBinding"/>
        <ConflictReason name="JobOutputMethod"/>
     </History>
   </UserOperationHistory>
```

F I G. 11
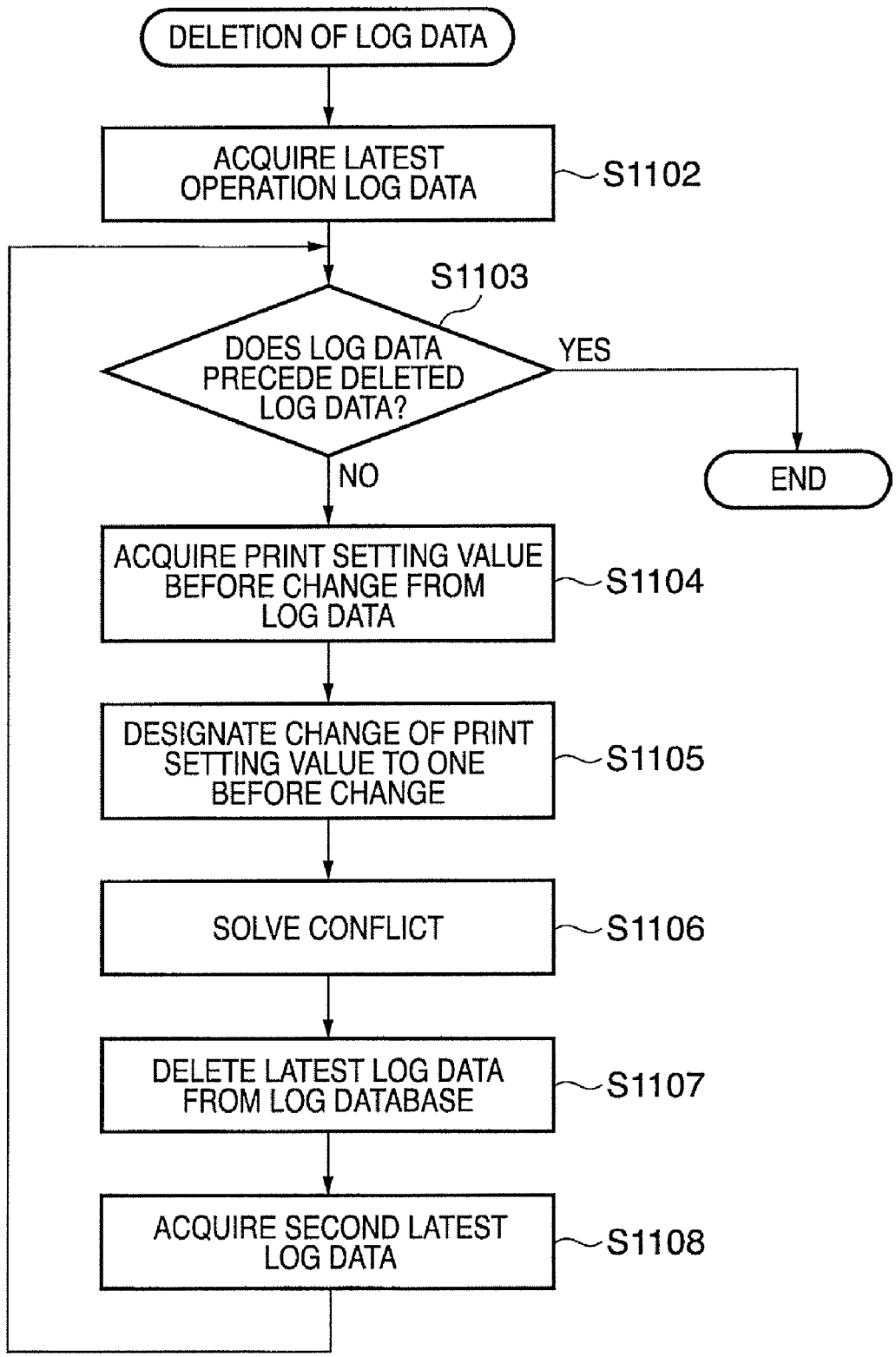

INFORMATION PROCESSING APPARATUS AND METHOD FOR INDICATING CONFLICTING PRINT SETTING FUNCTIONS

BACKGROUND OF THE INVENTION

1. Field of the Invention

The present invention relates to an information processing apparatus which displays an operation window having a plurality of types of print setting items to a printer and sets the print setting items, a control method therefor, and a computer program.

2. Description of the Related Art

When an application is to print a file of a document, graphics, or the like created on a computer, rendering data obtained from the file is generally converted into a printer control language using a printer driver, and the printer control language is transmitted to a printer. At this time, the user makes print settings associated with a printer (e.g., paper type, double-side printing, color, and paper feed stage) via a print setting user interface provided by the application or a print setting user interface provided by the printer driver. The user can make basic print settings via the user interface provided by the application. However, the user can neither set a special function of the printer nor make detailed settings unless he uses the user interface provided by the printer driver.

The number of printer driver functions is increasing year by year, and some printer drivers have several hundred functions. A print setting user interface has become complicated with many second and third layers which appear upon pressing buttons. It is difficult to decide a layer of the user interface to make settings. It is also cumbersome for the user to set so many functions. Further, the printer driver has many functional conflicts.

The functional conflict means that when one function is selected, another function becomes unavailable or another print setting value is rounded. For example, when the user selects user-defined paper, he cannot use the stapling function. In this case, when user-defined paper is selected, the setting item of the stapling function on the user interface is grayed out or hidden to inhibit selection, or a warning message is displayed.

In many cases, the user cannot make intended print settings on the user interface of the printer driver. Even if the user wants to make settings, an intended setting item is disabled on the user interface, or he cannot understand why he cannot make settings. Even if the user actually makes setting and prints, he cannot obtain the print result he wanted.

To solve this problem, the printer driver notifies the user by a message indicating a conflict. For example, "A conflict has occurred. You cannot use functions A and B at the same time." is displayed. From this display, the user can recognize that a conflict has occurred, and can change the function. Some printer drivers display a detailed reason of a setting error such as "You cannot use this function owing to function C." In this manner, the user is notified of a functional conflict by a message. As another method, an icon such as an exclamation mark is displayed at the setting item of an unselectable function to notify the user that the selection of this function will cause a conflict.

As still another conventional method, a conflict is solved using a user operation log. According to this method, log data of operations to set functions by the user on the user interface of the printer driver is saved, and frequently used functions are extracted on the basis of the operation log data. A print setting window is automatically generated on the basis of the extracted functions so as not to generate a conflict. Alternatively, the user is provided with several print conditions and prompted to select print conditions only from them. The user then need not be aware of a conflict. This method is disclosed in Japanese Patent Laid-Open Nos. 2002-073314 and 2006-039638.

However, according to the prior art, it is sometimes difficult to recognize a set operation which is a cause of a conflict and disabling the setting. Even when the reason of a conflict is displayed by a message, the user may not be able to specify the cause at once as the printer driver becomes very complicated.

Assume that there is a printer driver having a conflict that the "magnification (scaling)" function cannot be used when "bookbinding printing" is set, and a conflict that the "Nup" print function cannot be used when the "magnification" is unavailable. When the user is to select "bookbinding printing" and make the "Nup" print setting under this condition, he cannot select the "Nup" print setting. As the reason of the conflict, "the magnification is unavailable" is displayed. However, a correct reason of the conflict is not that the user set the magnification OFF but that he set "bookbinding printing".

In this case where not a single conflict but a plurality of conflicts have occurred, the user cannot recognize the cause from only a message based on one conflict. This is because one conflict may induce another conflict.

To restore print setting values to default values in order to solve a conflict, the user must memorize a series of operations and perform the restore operation in the order he performed these operations. This is because, even if the user changes only a conflicting function, print setting values cannot be completely restored to default values because another conflict may have occurred and the user further may have changed another print setting value. Moreover, the user may not be able to recognize a causal function owing to a complicated printer driver user interface.

When the user interface is automatically built on the basis of user operation log data, the user can perform an operation without being aware of a conflict, but cannot easily use functions other than frequently used ones. The user does not always utilize only frequently used functions, and may want to make special settings only when printing a specific document. In this case, if the user interface is automatically built, the user cannot find out required settings. Even if a conflict is solved, the user cannot make settings. In many cases, the user makes settings again from the beginning after restoring settings to a default state using an initial setting function such as the function to restore default settings.

SUMMARY OF THE INVENTION

The present invention has been made to overcome the conventional drawbacks, and has as its object to provide an information processing apparatus capable of easily confirming a print setting conflict and its cause and easily solving the conflict, a control method therefor, and a computer program.

According to the first aspect of the present invention, an information processing apparatus which displays an operation window having a plurality of types of print setting items for a printer and sets the print setting items, the apparatus comprising:

operation window display means for displaying an operation window including a first display area having a plurality of types of print setting items, and a second display area which displays log data representing a log of setting operations to the print setting items in the first display area;

designation means for performing an operation in the operation window;

setting means for setting a second print setting item, which conflicts with a first print setting item, to be disabled on the basis of an operation to the first print setting item among the plurality of types of print setting items;

storage means for storing, as the log data, information containing a print setting value of the first print setting item before a change, a print setting value of the first print setting item after the change, and the second print setting item disabled along with the change;

detection means for detecting presence/absence of designation by the designation means in a display area of the second print setting item; and display control means for, when the detection means detects the designation, controlling to display log data, of a setting operation serving as a cause of disabling the second print setting item among log data which are stored in the storage means and displayed in the second display area, so as to be distinctive from other log data.

In a preferred embodiment, the apparatus further comprises conflict information display means for, when the designation means designates log data from the log data list in the second display area, displaying conflict information about a print setting item conflicting with a printing setting item corresponding to the log data by referring to the storage means.

In a preferred embodiment, the apparatus further comprises deletion means for deleting log data selected from the log data list in the second display area; and setting changing means for, when the deletion means performs a delete operation, restoring a print setting value after the change corresponding to each log data generated after the deleted log data to a corresponding print setting value before the change by referring to the storage means.

In a preferred embodiment, the apparatus further comprises conflict rule storage means for storing and managing a conflict rule representing a rule to change a setting state of the second print setting item which conflicts with the first print setting item, wherein the setting means changes the setting state of the second print setting item to a setting state represented by the conflict rule on the basis of setting contents of the first print setting item.

According to the second aspect of the present invention, a method of controlling an information processing apparatus which displays an operation window having a plurality of types of print setting items to a printer and sets the print setting items, the method comprising:

an operation window display step of displaying an operation window including a first display area having a plurality of types of print setting items, and a second display area which displays log data representing a log of setting operations to the print setting items in the first display area;

a setting step of setting a second print setting item, which conflicts with a first print setting item, to be disabled on the basis of an operation to the first print setting item among the plurality of types of print setting items;

a storage step of storing, as the log data in a storage medium, information containing a print setting value of the first print setting item before a change, a print setting value of the first print setting item after the change, and the second print setting item disabled along with the change;

a detection step of detecting presence/absence of designation by designation means in a display area of the second print setting item; and a display control step of, when the designation is detected in the detection step, controlling to display log data, of a setting operation serving as a cause of disabling the second print setting item among log data which are stored in the storage medium and displayed in the second display area, so as to be distinct from other log data.

According to the third aspect of the present invention, a computer program which is stored in a computer-readable memory and causes a computer to control an information processing apparatus that displays an operation window having a plurality of types of print setting items to a printer and sets the print setting items, the program characterized by causing the computer to execute an operation window display step of displaying an operation window including a first display area having a plurality of types of print setting items, and a second display area which displays log data representing a log of setting operations to the print setting items in the first display area, a setting step of setting a second print setting item, which conflicts with a first print setting item, to be disabled on the basis of an operation to the first print setting item among the plurality of types of print setting items, a storage step of storing, as the log data in a storage medium, information containing a print setting value of the first print setting item before a change, a print setting value of the first print setting item after the change, and the second print setting item disabled along with the change, a detection step of detecting presence/absence of designation by designation means in a display area of the second print setting item, and a display control step of, when the designation is detected in the detection step, controlling to display log data, of a setting operation serving as a cause of disabling the second print setting item among log data which are stored in the storage medium and displayed in the second display area, so as to be distinct from other log data.

In a preferred embodiment, the computer program includes a printer driver for the printer.

According to the fourth aspect of the present invention, an information processing apparatus which displays an operation window having a plurality of types of print setting items for a printer and sets the print setting value, the apparatus comprising:

operation window display means for displaying an operation window including a first display area having a plurality of types of print setting items, and a second display area which displays log data representing a log of setting operations to the print setting items in the first display area;

designation means for performing an operation in the operation window;

setting means for setting a second print setting item, which conflicts with a first print setting item, to be disabled on the basis of an operation to the first print setting item among the plurality of types of print setting items;

storage means for storing, as the log data, the print setting value set by the operation to the first print setting item;

detection means for detecting presence/absence of designation by the designation means in a display area of the second print setting item; and display control means for, when the detection means detects the designation, controlling to display log data, of a setting operation serving as a cause of disabling the second print setting item among log data which are stored in the storage means and displayed in the second display area, so as to be distinctive from other log data.

According to the fifth aspect of the present invention, a method of controlling an information processing apparatus which displays an operation window having a plurality of types of print setting items for a printer and sets the print setting value, the apparatus comprising:

an operation window display step of displaying an operation window including a first display area having a plurality of types of print setting items, and a second display area which displays log data representing a log of setting operations to the print setting items in the first display area;

a designation step of performing an operation in the operation window;

a setting step of setting a second print setting item, which conflicts with a first print setting item, to be disabled on the basis of an operation to the first print setting item among the plurality of types of print setting items;

a storage step of storing, as the log data in a storage medium, the print setting value set by the operation to the first print setting item;

a detection step of detecting presence/absence of designation in the designation step in a display area of the second print setting item; and a display control step of, when the designation is detected in the detection step, controlling to display log data, of a setting operation serving as a cause of disabling the second print setting item among log data which are stored in the storage medium and displayed in the second display area, so as to be distinctive from other log data.

According to the sixth aspect of the present invention, a computer program which is stored in a computer-readable memory and causes a computer to control an information processing apparatus which displays an operation window having a plurality of types of print setting items for a printer and sets the print setting value, the program causes the computer to execute:

an operation window display step of displaying an operation window including a first display area having a plurality of types of print setting items, and a second display area which displays log data representing a log of setting operations to the print setting items in the first display area;

a designation step of performing an operation in the operation window;

a setting step of setting a second print setting item, which conflicts with a first print setting item, to be disabled on the basis of an operation to the first print setting item among the plurality of types of print setting items;

a storage step of storing, as the log data in a storage medium, the print setting value set by the operation to the first print setting item;

a detection step of detecting presence/absence of designation in the designation step in a display area of the second print setting item; and a display control step of, when the designation is detected in the detection step, controlling to display log data, of a setting operation serving as a cause of disabling the second print setting item among log data which are stored in the storage medium and displayed in the second display area, so as to be distinctive from other log data.

Further features of the present invention will become apparent from the following description of exemplary embodiments with reference to the attached drawings.

BRIEF DESCRIPTION OF THE DRAWINGS

FIG. 7 is a view showing an example of a log database according to the embodiment of the present invention;

FIG. 11 is a flowchart showing a log data deletion process executed by the configuration module according to the embodiment of the present invention.

DESCRIPTION OF THE EMBODIMENT

A preferred embodiment of the present invention will now be described in detail with reference to the drawings. It should be noted that the relative arrangement of the components, the numerical expressions and numerical values set forth in the embodiment do not limit the scope of the present invention unless it is specifically stated otherwise.

Prior to a description of a preferred embodiment of the present invention, problems of the prior art will be explained again.

As described above, when making print settings via a printer driver UI, some print settings cannot be made simultaneously. When print settings conflict with each other, there has conventionally been proposed a method (preset priority) of graying out a conflicting print setting item on the printer driver UI so as to inhibit the user from selecting the item. According to this method, however, the user cannot select a grayed-out print setting item when he wants to select it. The user cannot recognize a print setting item which is the cause of failing to set a desired print setting item. This results in poor operability.

It is also possible to display the reason of a conflict. However, even if conflicting print settings are listed, the user cannot quickly recognize a direct factor among current print settings unless he well understands a print setting conflict.

The second conventional method is a method (custom priority) of actively displaying even a print setting item predicted to conflict, and when the user selects the print setting item, forcibly canceling another conflicting print setting. According to this method, however, even when the user wants to give priority to the canceled print setting, the print setting is canceled. The user must select the print setting item again, resulting in poor operability.

To solve these problems, the present invention displays the log of print setting items (setting values) set by the user on the printer driver UI (User Interface). Every time the user makes a print setting, it is determined whether a conflict occurs, and a conflicting print setting item is grayed out. If the user selects a grayed-out print setting item, the printer driver UI specifically displays log data of a print setting operation which will cause a conflict with the print setting item. If the user deletes the log data, it is determined again whether a conflict occurs, thereby solving a conflict.

Log data of print setting operations is displayable on any sheet or window when the printer driver UI is made up of a plurality of tab sheets or a plurality of layered windows.

When the user deletes a given print setting from log data, a relevant print setting item is also deleted.

A preferred embodiment of the present invention will be described in detail with reference to the accompanying drawings.

Figure 1:
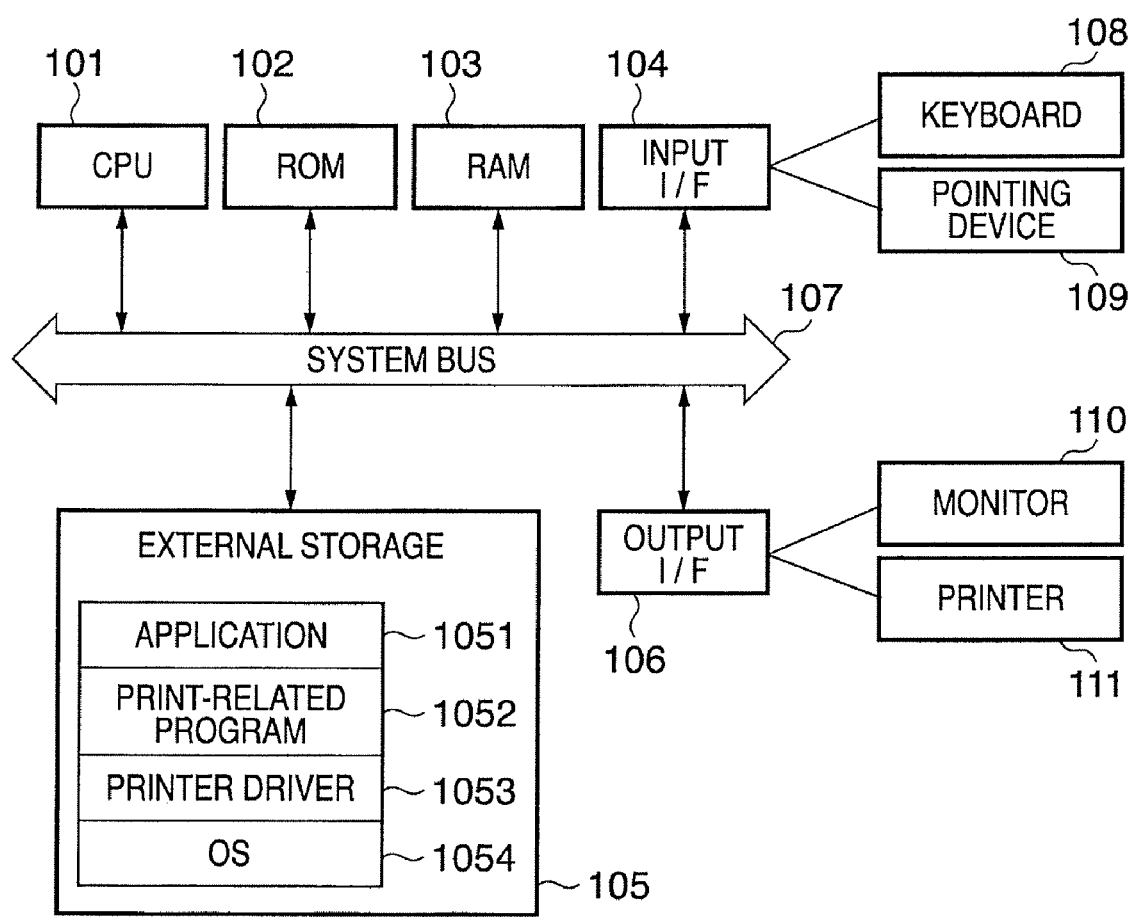
FIG. 1 is a block diagram of a print processing system according to an embodiment of the present invention.

FIG. 1 is a block diagram of a print processing system according to the embodiment of the present invention.

The present invention is applicable to a system having the functions of a single device or formed from a plurality of devices, or a system which is connected via a network such as a LAN or WAN to perform processes as far as the system can execute the present invention, unless otherwise specified.

FIG. 1 is a block diagram of a system using a general computer. A CPU 101 controls the overall system in accordance with a program stored in a ROM 102, RAM 103, or external storage unit 105. The RAM 103 is also used as a work area when the CPU 101 executes various processes.

The external storage unit 105 stores programs such as an operating system (OS) 1054, application 1051, print-related program 1052, and printer driver 1053. Input devices such as a keyboard 108 and pointing device 109 allow the user to give various instructions to the computer via an input I/F 104.

The print-related program 1052 includes various programs related to printing, such as a graphics engine and print manager in FIG. 2 (to be described later).

An output I/F 106 is an interface for outputting data outside. The output I/F 106 outputs data to a monitor 110 and printer 111. The monitor 110 can display user interfaces implemented by the application 1051 and printer driver 1053. The user can perform various settings and operations on the user interfaces via the input device. The printer 111 may be connected not only via a local I/O but also via a network. A system bus 107 is used to exchange data between various constituent elements of the computer.

The software configuration of the print processing system according to the embodiment will be explained with reference to FIG. 2.

Figure 2:
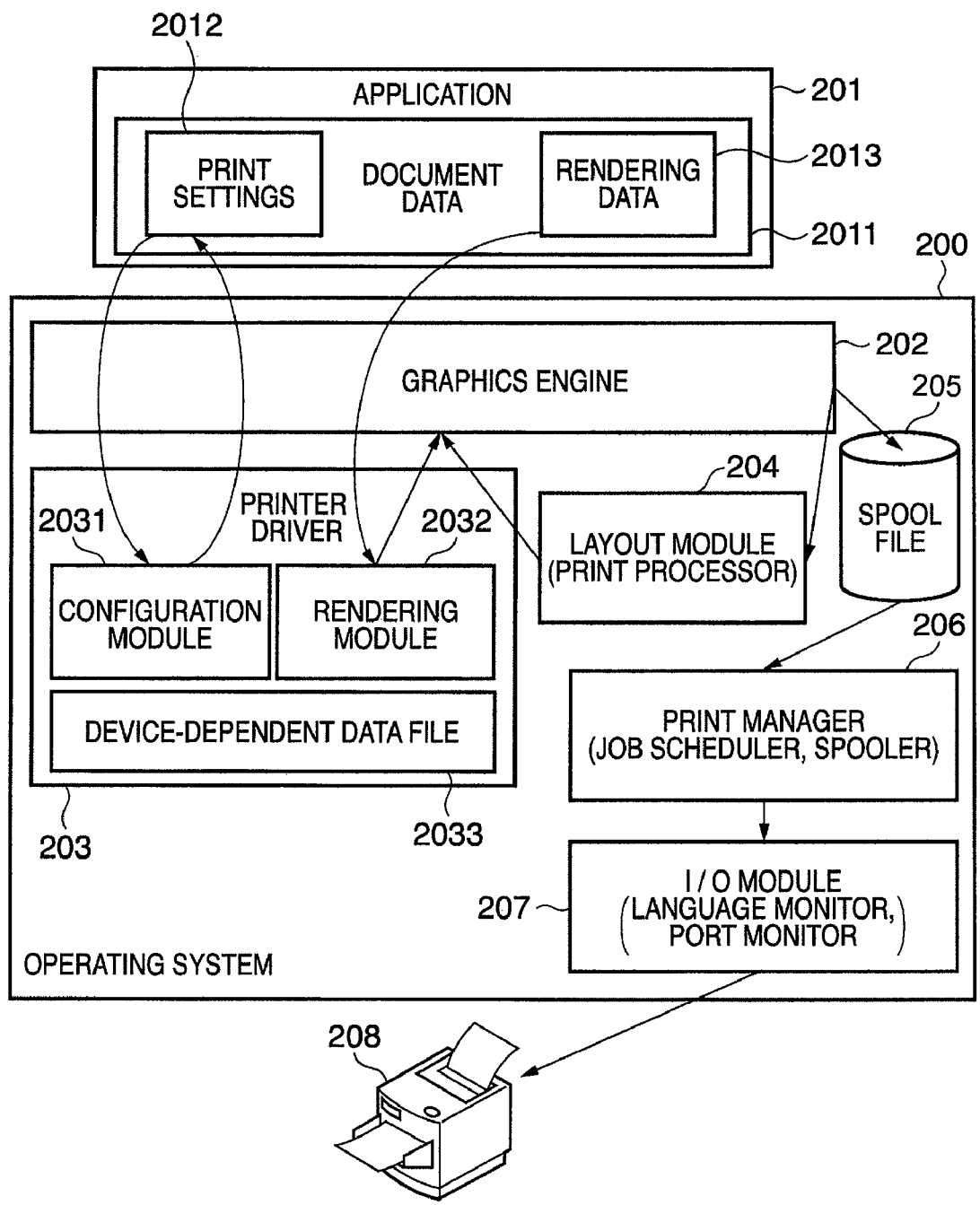
FIG. 2 is a view showing the software configuration of the print processing system according to the embodiment of the present invention.

FIG. 2 is a view showing the software configuration of the print processing system according to the embodiment of the present invention.

In FIG. 2, an application 201 corresponds to the application 1051 in FIG. 1. A graphics engine 202, layout module 204, and print manager 206 correspond to the print-related program 1052 in FIG. 1. A printer driver 203 corresponds to the printer driver 1053 in FIG. 1. An operating system 200 corresponds to the OS 1054 in FIG. 1. A printer 208 corresponds to the printer 111 in FIG. 1.

FIG. 2 shows the software configuration of a print processing system implemented on a general computer. The user can print document data 2011 created with the application 201 displayed on the monitor 110 via an input device such as the keyboard 108 or pointing device 109.

The print process is executed by sequentially performing three processes: selection of a printer, creation of print settings, and conversion into rendering data. As printer selection, for example, the printer driver 203 corresponding to the printer 208 to print is selected.

Then, print settings are created. A configuration module 2031 of the printer driver 203 creates the initial values of print settings 2012 of a document. Final print settings are determined by changing the initial values using the user interface of the application 201 or printer driver 203 so as to obtain a final print result intended by the user. For example, paper is changed to "A5", and double-sided printing is set. In addition, the paper orientation and layout are set.

Print settings can be saved in two data formats: one is a binary data structure called DEVMODE, and the other is text data in a markup language XML using tags called a print ticket. The data format changes depending on the specifications of the printer driver 203 and operating system 200.

Finally, the document data 2011 is converted into rendering data 2013 which is a set of images to be actually printed. After creating the print settings 2012, the user executes the print process, and the operating system 200 is notified of it. The operating system 200 processes the rendering data 2013 by the designated printer driver 203 via the graphics engine 202.

When the print settings 2012 designate a layout process, a temporary spool file 205 is created, and the layout module (print processor) 204 is activated before the printer driver 203 executes a process. The layout process means an image process to change the order of sheets or lay out a plurality of pages on one sheet. The printer driver 203 processes the rendering data 2013 after the layout module 204 changes the layout.

The printer driver 203 uses a rendering module 2032 to convert the rendering data 2013 into a data language, i.e., printer control language understandable by the printer 208. At this time, the printer driver 203 also converts the print settings 2012 into the printer control language.

Both the configuration module 2031 and rendering module 2032 are often common to a plurality of types of printers 208. A device-dependent data file 2033 describes information representing the performance of each device. The configuration module 2031 and rendering module 2032 refer to the device-dependent data file 2033, as needed. The printer control language obtained by converting the rendering data 2013 are sequentially saved as the spool file 205. Upon completion of conversion, the print manager 206 acquires the spool file 205, holds it as a print job file, and manages the schedule of the print process.

When the printer 208 becomes printable, the print manager 206 transmits print job data to the printer 208 via an I/O module 207. In this manners the document data 2011 from the application 201 is converted into the printer control language, which is printed by the printer 208.

The detailed arrangement of the configuration module 2031 of the printer driver 203 according to the embodiment will be described with reference to FIG. 3. A user interface of the printer driver 203 will be described with reference to FIG. 4.

Figure 3:
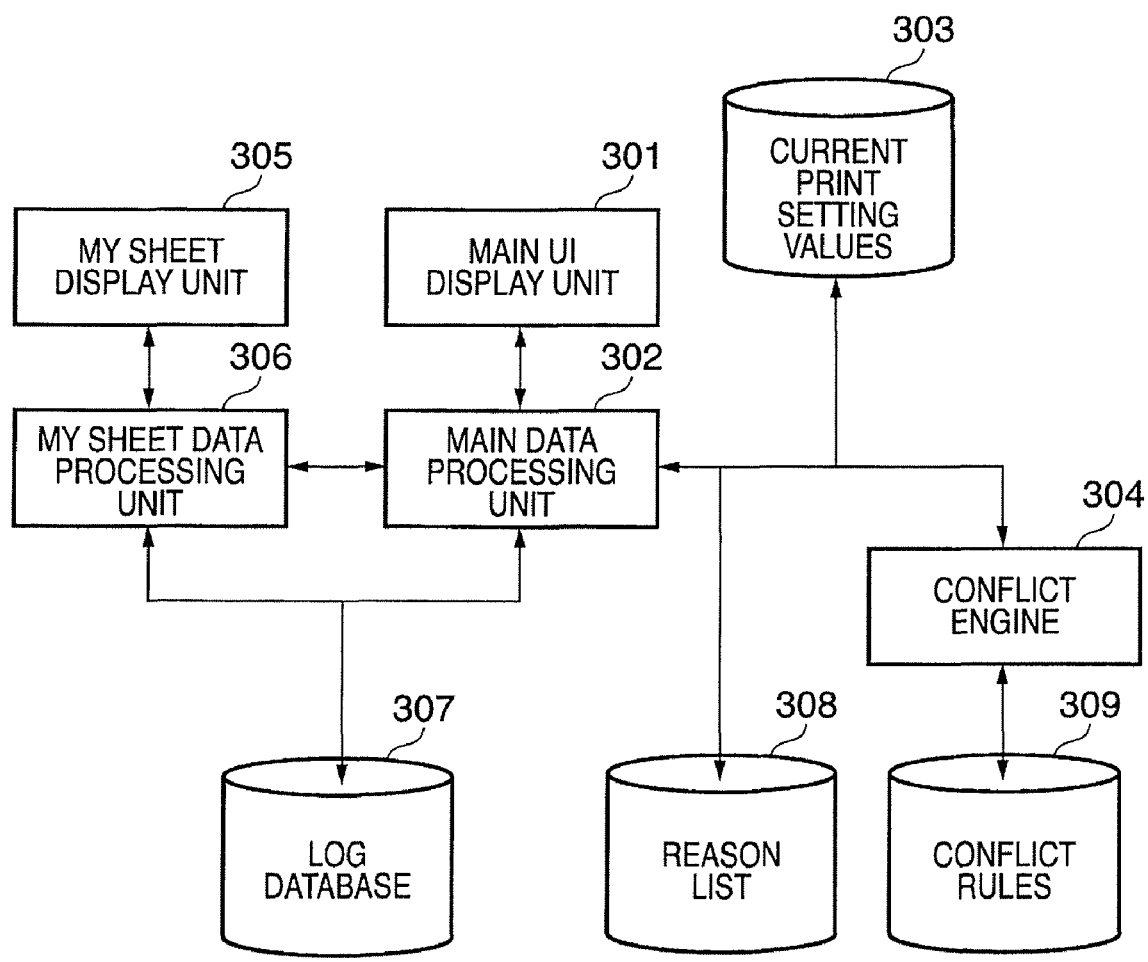
FIG. 3 is a block diagram showing the detailed arrangement of a configuration module according to the embodiment of the present invention.
Figure 4:
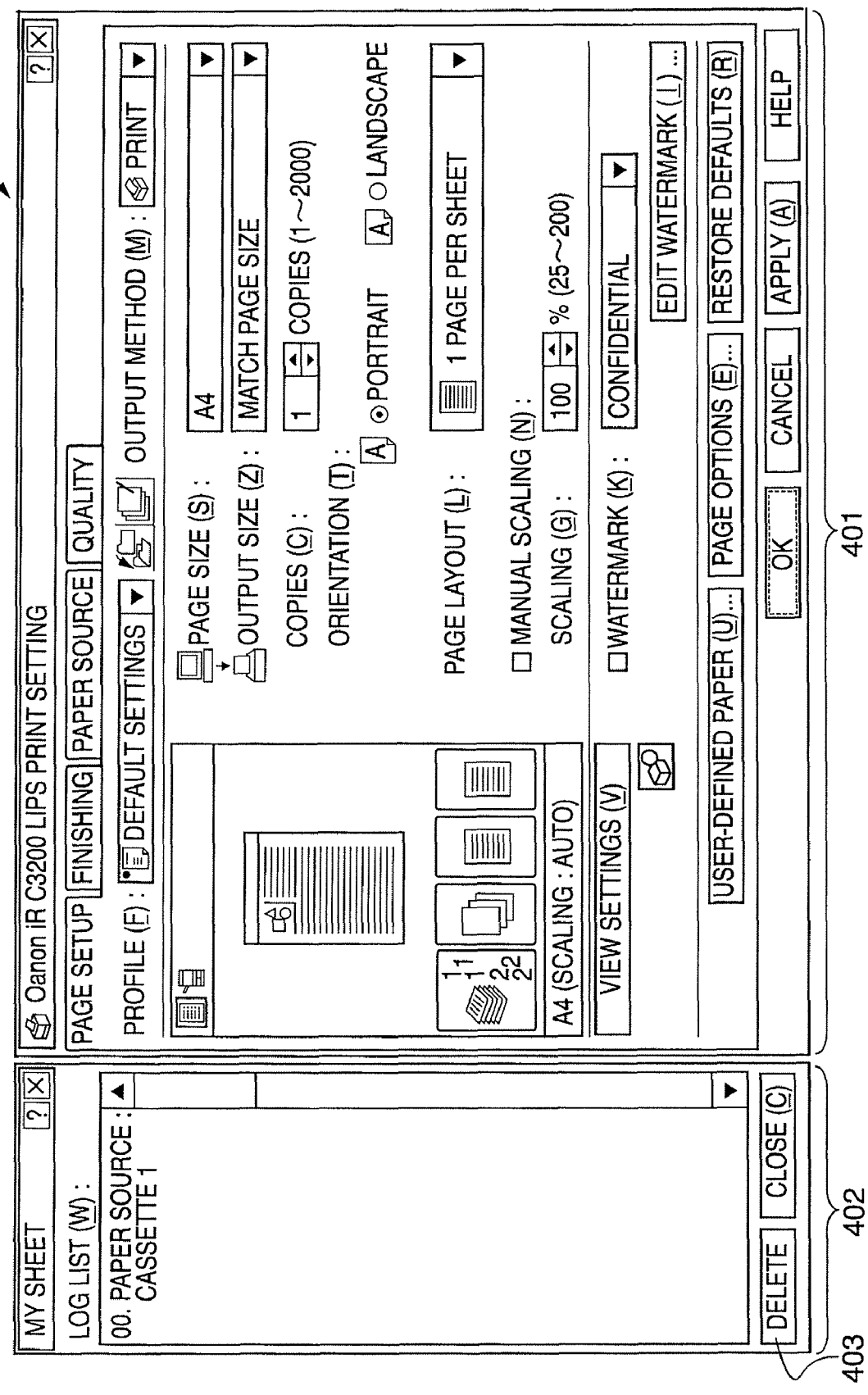
FIG. 4 is a view showing a user interface of a printer driver according to the embodiment of the present invention.

FIG. 3 is a block diagram showing the detailed arrangement of the configuration module according to the embodiment of the present invention. FIG. 4 is a view showing a user interface of the printer driver according to the embodiment of the present invention.

The configuration module 2031 is roughly formed from five modules and four data. The four data are managed in the RAM 103 or external storage unit 105. A main UI display unit 301 forms and displays a main UI window 401 out of a user interface (UI) 400 serving as an operation window in FIG. 4. A main data processing unit 302 sets and manages data displayed in the main UI window 401.

The main UI window 401 is a print setting window in which a plurality of types of print setting items are provided on a tab sheet of each category. As shown in FIG. 4, the main UI window 401 has controls (pull-down menus, radio buttons, check boxes, and the like) to make various print settings such as page size, output size, and page layout.

A my sheet display unit 305 forms and displays a my sheet window 402 out of the user interface 400. A my sheet data processing unit 306 sets and manages data displayed in the my sheet window 402. The my sheet window 402 is a display window which displays print setting operation log data as a log data list. The user can select log data from the log data list in the my sheet window 402 and operate a delete button 403 to delete the selected log data.

The my sheet display unit 305 controls to always display the my sheet window 402 even when display items (tab sheet) in the main UI window 401 change, as long as the main UI window 401 is displayed.

A conflict engine 304 solves a conflict between print setting values on the basis of current print setting values 303 set in the main UI window 401 and conflict rules 309 set in advance. When the first print setting item is set, solving a conflict means disabling the conflicting second print setting item so as to prevent a conflict.

A log database 307 manages print setting operation log data. In general, the log data is managed for each user who operates the printer driver 203. A reason list 308 collects and manages print setting values (print setting items) which become unchangeable as a result of solving a conflict.

In FIG. 4, the main UI window 401 and my sheet window 402 are formed from different windows, but are not limited to this example. For example, the first and second display areas respectively corresponding to the main UI window 401 and my sheet window 402 may be defined in a single window.

A process to save and display user's print setting operation log data will be explained with reference to FIG. 5 as a process executed by the configuration module 2031, which is a feature of the embodiment of the present invention.

Figure 5:
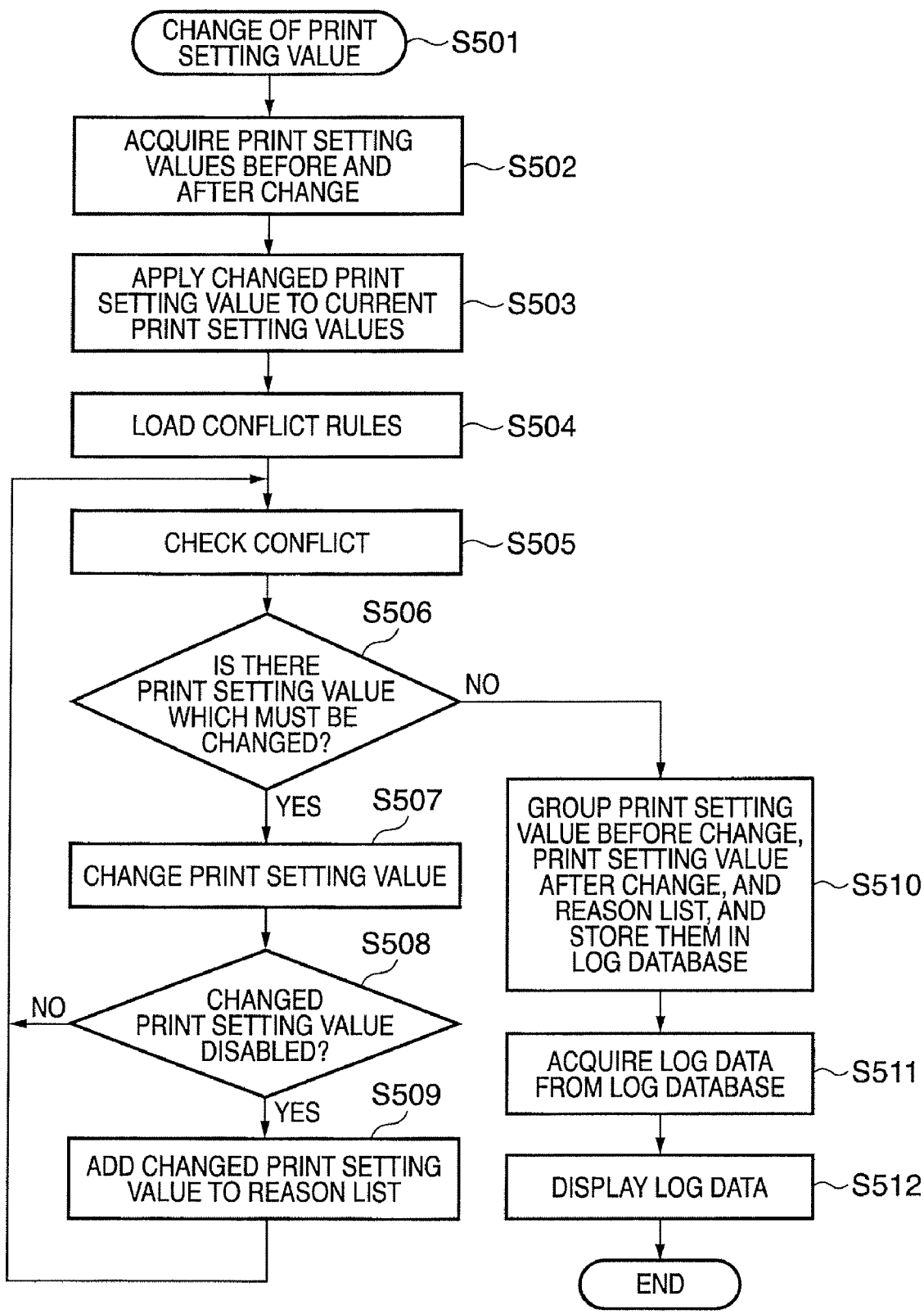
FIG. 5 is a flowchart showing a process executed by the configuration module according to the embodiment of the present invention.

FIG. 5 is a flowchart showing a process executed by the configuration module according to the embodiment of the present invention. In particular, the process to save and display user operation log data will be described with reference to FIG. 5.

The main UI display unit 301 changes a print setting value on the basis of an operation by the user to the main UI window 401 of the user interface 400 (step S501). The main UI display unit 301 recognizes and acquires print setting values before and after the change, and transfers them to the main data processing unit 302 (step S502).

The main data processing unit 302 applies the changed print setting value to the current print setting values 303 to create new print setting values and register them as the current print setting values 303 (step S503). The main data processing unit 302 transfers the new print setting values to the conflict engine 304, and tries to solve a conflict. The conflict engine 304 loads the conflict rules 309 describing all combinations of conflicting operations or print setting items in the printer driver 203 (step S504).

An example of the conflict rules will be explained with reference to FIG. 6.

Figure 6:
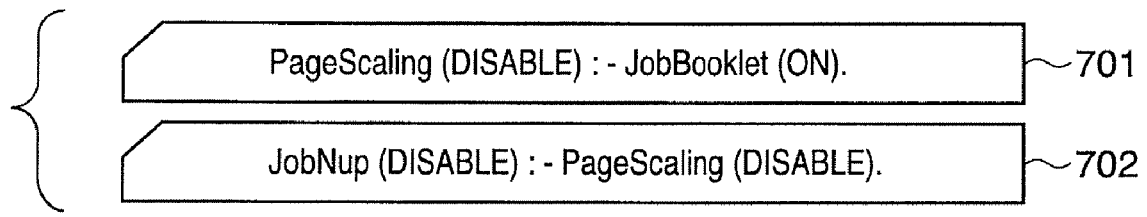
FIG. 6 is a view showing an example of conflict rules according to the embodiment of the present invention.

FIG. 6 is a view showing an example of the conflict rules according to the embodiment of the present invention.

FIG. 6 shows some conflict rules loaded into the conflict engine 304. In FIG. 6, two conflict rules 701 and 702 are described. In the embodiment, the conflict rule description is an expression divided into left- and right-hand sides by a sign ":-" If a condition on the right-hand side is met, a condition on the left-hand side is set.

The conflict rule 701 is a description representing that if the JobBooklet (bookbinding printing) function is set "ON", the PageScaling (page scaling) function is "Disabled" (unavailable). This means that if bookbinding printing is set as a printing method, the magnification (page scaling) function is grayed out on the user interface to inhibit a user operation (disable the operation).

The conflict rule 702 is a description representing that if the PageScaling (page scaling) function is "Disabled", the JobNup function is "Disabled". This means that if the magnification function becomes unavailable, the Nup function is grayed out on the user interface to also disable the Nup function.

Referring back to FIG. 5, the conflict engine 304 loads the conflict rules 309, and interprets them (conflict check). The conflict engine 304 solves a conflict between print setting values according to the conflict rules 309 (step S505). Solving a conflict is to disable (gray out) the first print setting item set in advance and the conflicting second print setting item in the main UI window 401, as described above.

For this purpose, the conflict engine 304 reads out the conflict rules 309 one by one, and determines whether there is a print setting value which must be changed according to the conflict rules (step S506).

If there is a print setting value which must be changed (YES in step S506), the conflict engine 304 changes the print setting value (step S507). At this time, the conflict engine 304 determines whether the changed print setting value is grayed out, i.e., disabled (step S508). If the changed print setting value is disabled (YES in step S508), the conflict engine 304 adds the print setting value to the reason list 308 (step S509). The conflict engine 304 repeats the conflict check until all print setting values satisfy the conflict rules.

If all print setting values satisfy the conflict rules, there is no more print setting value to be changed (NO in step S506), the conflict engine 304 ends the process, and returns it to the main data processing unit 302.

The main data processing unit 302 groups the reason list 308, and the print setting values before and after the change which have been transferred from the main UI display unit 301. The main data processing unit 302 stores the group as log data (log information) in the log database 307 (step S510)

An example of the log database will be explained with reference to FIG. 7.

FIG. 7 is a view showing an example of the log database according to the embodiment of the present invention.

As shown in FIG. 7, the log database 307 saves log data as XML data. The <History . . . > tag holds log data of one user operation. The <Feature . . . > tag holds changed function data (print setting value). The <UndoFeatureValue> tag holds function data (print setting value) before change. The <ConflictReason name . . . > tag holds the contents of the reason list.

The <History . . . > tag has the "order" attribute which can hold even the order the user performed the processes. The "order" is incremented by one every time log data is added to the log database 307. In this order, log data can be acquired in time series or tracked. The save format in the log database 307 is the XML format in the embodiment, but the log database 307 may also save CSV data, text data, or binary data.

Referring back to FIG. 5, after saving log data in the log database 307, the main data processing unit 302 notifies the my sheet data processing unit 306 of the end of saving log data. In response to this, the my sheet data processing unit 306 acquires log data from the log database 307 (step S511). The my sheet data processing unit 306 notifies the my sheet display unit 305 of the acquired log data. The my sheet display unit 305 displays the log data in the my sheet window 402 of the user interface 400 on the basis of the "order" attribute (step S512). By this process, time-series log data of user operations are sequentially displayed in the my sheet window 402.

A display control process executed by the configuration module when the user designates a (grayed-out) print setting item on the user interface 400 with the pointer (cursor) of the pointing device will be explained with reference to FIG. 8.

Figure 8:
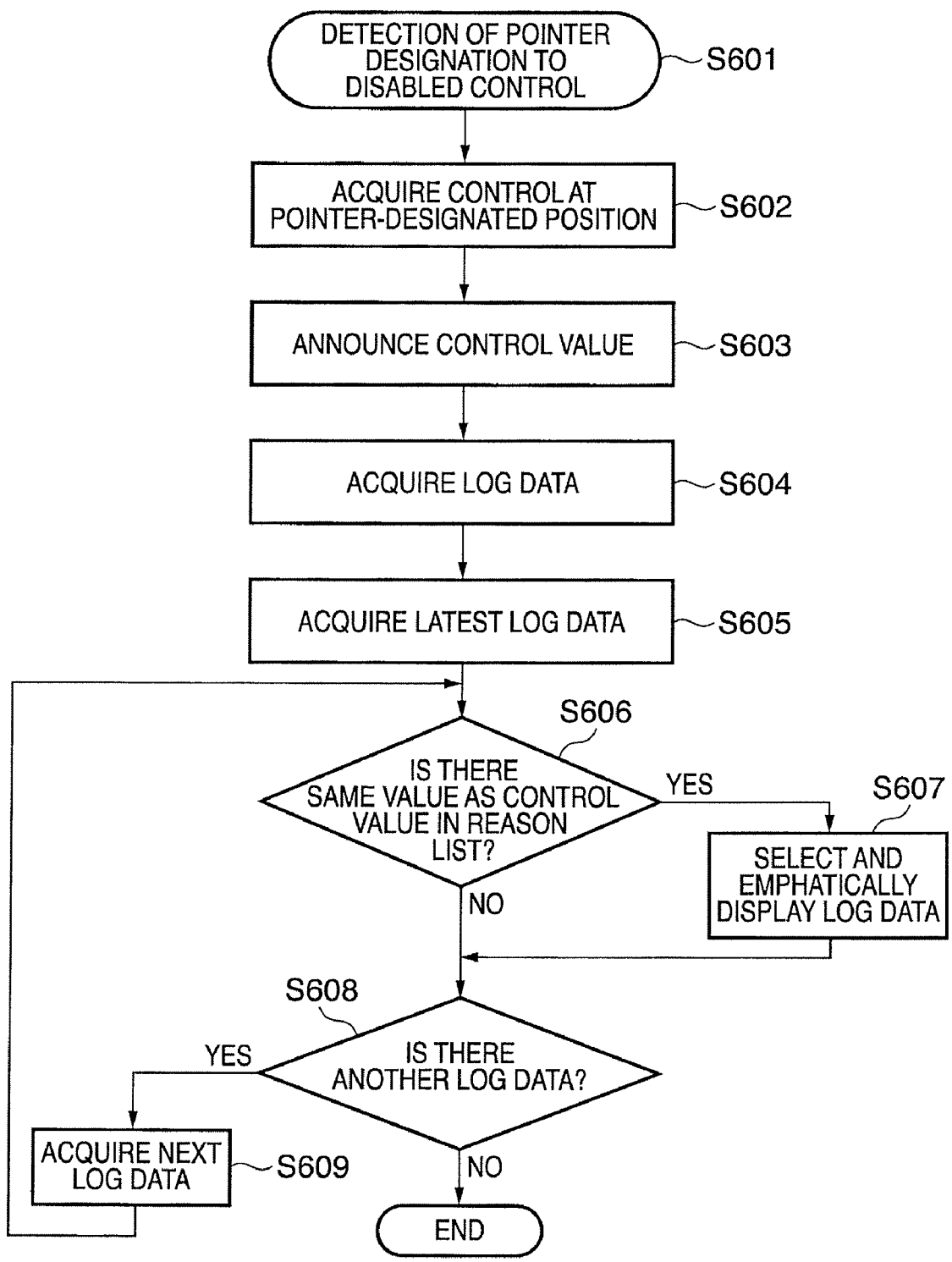
FIG. 8 is a flowchart showing a display control process executed by the configuration module according to the embodiment of the present invention.

FIG. 8 is a flowchart showing the display control process executed by the configuration module according to the embodiment of the present invention.

Based on a user operation, the main UI display unit 301 detects pointer designation by the pointing device to a disabled control grayed out on the user interface 400 (step S601).

The pointer designation means that the pointer has existed for a predetermined time within a predetermined range in a coordinate area (display area) which forms a disabled control. In other words, the pointer designation means that the button of the mouse serving as a pointing device is clicked once or more in a coordinate area which forms a disabled control. The pointer is operable with the keyboard 108 or pointing device 109.

The main UI display unit 301 specifies a control in an area belonging to the pointer designation position, and specifies a function (print setting item) indicated by the control (step S602).

The main UI display unit 301 notifies the main data processing unit 302 of the designation of the disabled control (unavailable print setting function) and the designated function as a result of specifying the control and function. In response to this, the main data processing unit 302 notifies the my sheet data processing unit 306 of the control value (print setting value) (step S603).

The my sheet data processing unit 306 acquires a set of log data from the log database 307 (step S604). The my sheet data processing unit 306 acquires log data of the latest operation from the set of log data (step S605). By referring to the reason list in the log data, the my sheet data processing unit 306 determines whether there is the same value as the designated control value (step S606).

If there is the same value (YES in step S606), the my sheet display unit 305 selects the log data and emphatically displays it in the my sheet window 402 (step S607). If there is no same value (NO in step S606), the my sheet display unit 305 determines whether there is unprocessed log data (step S608).

The emphatic display in step S607 means discriminative display, such as highlighting or blinking display, which displays target log data to be distinct from other log data. The emphatic display is arbitrary as long as the user can easily identify target log data.

If there is unprocessed log data (YES in step S608), the my sheet display unit 305 acquires the next log data (step S609). The process returns to step S606 to determine whether there is the same value as the designated control function. This determination is repeated, and if there is no more unprocessed log data, the process ends.

In this way, an operation serving as a cause of failing to set a designated control in user operation log data is emphatically displayed in the my sheet window 402 and presented to the user.

An example of this display will be explained with reference to FIG. 9.

Figure 9:
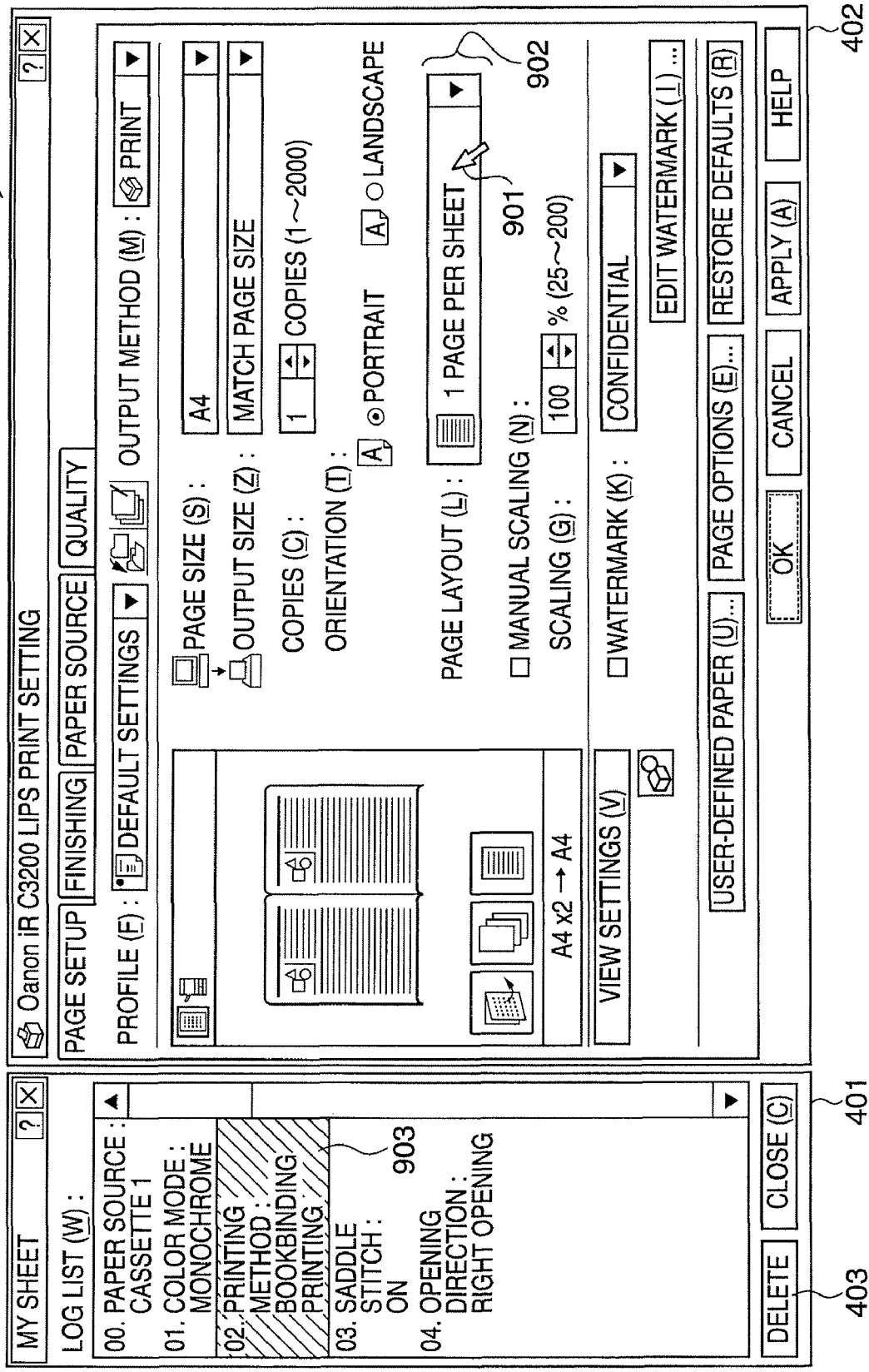
FIG. 9 is a view showing an emphatic display of log data according to the embodiment of the present invention.

FIG. 9 is a view showing an emphatic display of log data according to the embodiment of the present invention.

Referring to FIG. 9, when a disabled control 902 (in this case, the page layout function) is designated with a cursor 901, log data (print setting value) 903 serving as a cause of disabling the control 902 is emphatically displayed. The user can easily confirm a past operation (print setting value) which has disabled change of the setting.

Especially in FIG. 9, the page layout control 902 is disabled owing to the log data (print setting value) 903 of the printing method (bookbinding printing) in the log data list displayed in the my sheet window 402.

Figure 10:
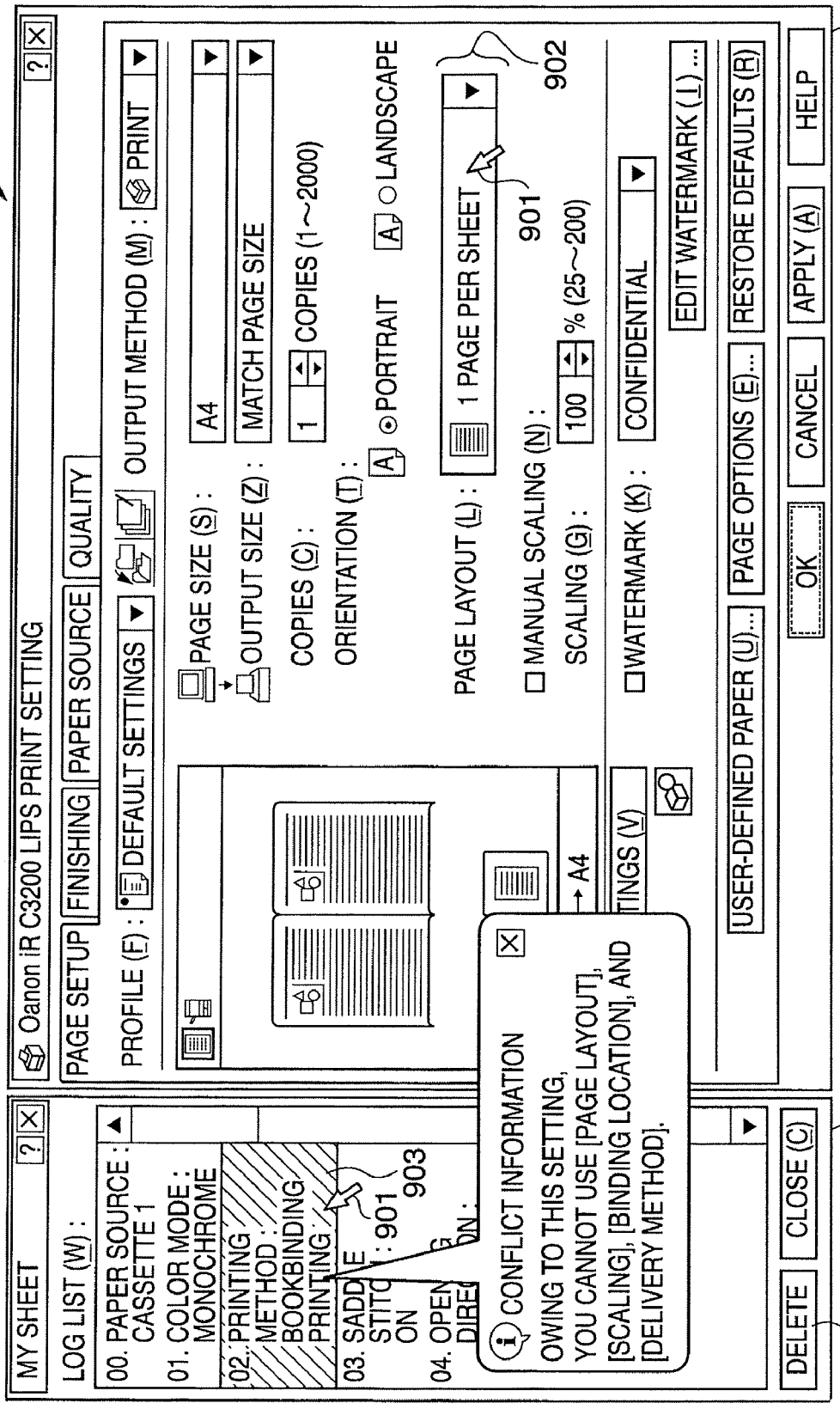
FIG. 10 is a view showing a display of conflict information according to the embodiment of the present invention.

When the user designates log data with the cursor 901 in the log data list displayed in the my sheet window 402, conflict information based on the log data is popup-displayed (FIG. 10). This function presents the user with reason list data of the log data in the log database 307 as tool tip information. This function allows the user to trace back past log data and extract conflict information (cause of a conflict) when the target operation was done. Only by sequentially designating log data, the user can confirm corresponding conflict information.

The conflict information can also be output to the user in an output form other than tool tip information, such as a dedicated dialog or sound.

By deleting log data with the delete button 403, the user can trace back log data sequentially one by one and reliably restore all print setting values till a conflicting operation. The log data deletion process will be explained with reference to FIG. 11.

FIG. 11 is a flowchart showing the log data deletion process executed by the configuration module according to the embodiment of the present invention.

Selected log data is deleted from the log data list in the my sheet window 402 of the user interface 400 on the basis of a user operation (step S1101). This operation can be implemented by selecting and designating one log data with the cursor and pressing the Delete key of the keyboard. This operation can also be implemented by operating the delete button 403 in the my sheet window 402.

The my sheet display unit 305 recognizes the deleted log data, and notifies the my sheet data processing unit 306 of it. The my sheet data processing unit 306 acquires log data of the latest operation from a set of log data acquired from the log database 307 (step S1102). The my sheet data processing unit 306 determines whether the acquired log data immediately precedes the deleted log data (step S1103). The purpose of this determination is not to trace back log data further from the deleted log data.

If the acquired log data immediately precedes the deleted log data (YES in step S1103), the process ends. If the acquired log data does not immediately precede the deleted log data (NO in step S1103), the my sheet data processing unit 306 acquires a print setting value before change corresponding to the acquired log data (step S1104). That is, the my sheet data processing unit 306 acquires UndoFeatureValue in FIG. 7.

The my sheet data processing unit 306 instructs the main data processing unit 302 to restore the print setting value to one before the change (step S1105). The main data processing unit 302 changes the current print setting value 303 to the received print setting value before change, and transfers the changed print setting value 303 to the conflict engine 304 to solve a conflict (step S1106). The conflict engine 304 changes the current print setting value 303 in order to solve a conflict, and returns the current print setting value 303 to the main data processing unit 302.

The main data processing unit 302 notifies the my sheet data processing unit 306 that the current print setting value 303 has been restored to the print setting value before the change. The my sheet data processing unit 306 deletes the latest log data from the log database 307 (step S1107). The my sheet data processing unit 306 acquires the second latest log data (step S1108). The process returns to step S1103 to repeat the work to restore a print setting value to the one before the change till the log data deleted by the user. After the end of the work, the process ends.

Based on print setting operation log data, the user can restore print setting values to default ones till the position of conflicting log data in the log data list, and can make print settings again.

The my sheet window 402 is always displayed independently of the main UI window 401 even upon a change to a tab sheet in the main UI window 401. Even if the user forgets a tab sheet having a print setting item set by the user, he can delete log data in order to solve a conflict.

As described above, according to the embodiment, when the user designates an unavailable (disabled) control, log data serving as a cause which disables the control can be distinctively displayed and presented to the user. From the log data, the user can quickly recognize a conflicting past operation. That is, the user can easily recognize a conflicting operation even when more than one conflicts occur in association with each other.

When solving a conflict, the user need not restore all print setting values set in the past to standard print setting values (default values). The user can restore print setting values in the order they were set only by deleting target log data from the log data list. As a result, the user can completely restore print setting values to those before generation of a conflict. The user can easily solve a conflict on the basis of constantly displayed log data without checking each operation window of a user interface having a complicated arrangement (operation windows).

In the embodiment, the printer driver 203 implements the user interface in FIG. 4. However, the user interface can also be implemented by another software such as a dedicated application or the plug-in module of an application.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-341940 field on Dec. 19, 2006, which is hereby incorporated by reference herein in its entirety.

What is claimed is:

1. An information processing apparatus comprising:
    an operation window display unit for displaying an operation window including a first display area having a plurality of types of print setting items and a second display area which displays log data representing a log of setting operations of the print setting items in the first display area;
    a setting unit for setting a second print setting item, which conflicts with a first print setting item, as disabled based on an operation of the first print setting item among the plurality of types of print setting items;
    a display control unit for controlling, when the second print setting item which said setting unit has set as disabled is designated, the second display area to display log data, of a setting operation which caused disabling the second print setting item among log data displayed in the second display area, to be distinctive from other log data;
    a storage unit for storing, as the log data, information containing print setting values of print setting items before changes;
    a deletion unit for performing a delete operation of deleting log data selected from the log data list in the second display area; and
    a setting changing unit for restoring, when said deletion unit performs the delete operation, a print setting value after a change, corresponding to each of a plurality of log data generated after the log data was deleted, to a corresponding print setting value before the change, by referring to the information stored in said storage unit.

2. A method of controlling an information processing apparatus comprising:
    an operation window display step of displaying an operation window including a first display area having a plurality of types of print setting items and a second display area which displays log data representing a log of setting operations of the print setting items in the first display area;
    a setting step of setting a second print setting item, which conflicts with a first print setting item, as disabled based on an operation of the first print setting item among the plurality of types of print setting items;
    a display control step of controlling, when the second print setting item which said setting step has set as disabled is designated, the second display area to display log data, of a setting operation which caused disabling the second print setting item among log data displayed in the second display area, to be distinctive from other log data;
    a storage step for storing, as the log data, information containing print setting values of print setting items before changes;
    a deletion step for performing a delete operation of deleting log data selected from the log data list in the second display area; and
    a setting changing step for restoring, when said deletion step performs the delete operation, a print setting value after a change, corresponding to each of a plurality of log data generated after the log data was deleted, to a corresponding print setting value before the change, by referring to the information stored in said storage step.

3. A computer program which is stored in a computer-readable memory and causes a computer to control an information processing apparatus the program causes the computer to execute:
    an operation window display step of displaying an operation window including a first display area having a plurality of types of print setting items and a second display area which displays log data representing a log of setting operations of the print setting items in the first display area;
    a setting step of setting a second print setting item, which conflicts with a first print setting item, as disabled based on an operation of the first print setting item among the plurality of types of print setting items;
    a display control step of controlling, when the second print setting item which said setting step has set as disabled is designated, the second display area to display log data, of a setting operation which caused disabling the second print setting item among log data displayed in the second display area, to be distinctive from other log data;
    a storage step for storing, as the log data, information containing print setting values of print setting items before changes;
    a deletion step for performing a delete operation of deleting log data selected from the log data list in the second display area; and
    a setting changing step for restoring, when said deletion step performs the delete operation, a print setting value after a change, corresponding to each of a plurality of log data generated after the log data was deleted, to a corresponding print setting value before the change, by referring to the information stored in said storage step.

4. The apparatus according to claim 1, further comprising:
a designation unit for performing an operation in the operation window; and
a detection for detecting presence/absence of designation by said designation unit in a display area of the second print setting item;
wherein said display control unit determines that the second print setting item said setting unit disabled which is designated by said detection unit detects the designation.

5. The apparatus according to claim 1, further comprising a conflict information display unit for, when said designation unit designates log data from the log data list in the second display area, displaying conflict information about a print setting item conflicting with a printing setting item corresponding to the log data by referring to said storage unit.

6. The apparatus according to claim 4, further comprising a conflict rule storage unit for storing and managing a conflict rule representing a rule to change a setting state of the second print setting item which conflicts with the first print setting item,
wherein said setting unit changes the setting state of the second print setting item to a setting state represented by the conflict rule on the basis of setting contents of the first print setting item.

\* \* \* \* \*